US012663739B2

(12) United States Patent
Hatanaka

(10) Patent No.: US 12,663,739 B2
(45) Date of Patent: Jun. 23, 2026

(54) DEVELOPER STORAGE BODY INCLUDING FRAME BODY HAVING CONTACT SURFACE WITH HOLES AND SEAL MEMBER CONTACTING CONTACT SURFACE

(71) Applicant: Oki Electric Industry Co., Ltd., Tokyo (JP)

(72) Inventor: Shun Hatanaka, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 19/011,994

(22) Filed: Jan. 7, 2025

(65) Prior Publication Data

US 2025/0328093 A1 Oct. 23, 2025

(30) Foreign Application Priority Data

Apr. 19, 2024 (JP) ................................ 2024-068484

(51) Int. Cl.
*G03G 15/08* (2006.01)

(52) U.S. Cl.
CPC ..... *G03G 15/0898* (2013.01); *G03G 15/0817* (2013.01); *G03G 15/0865* (2013.01); *G03G 15/0881* (2013.01); *G03G 15/0889* (2013.01); *G03G 15/0891* (2013.01); *G03G 2221/1648* (2013.01)

(58) Field of Classification Search
CPC ........... G03G 15/0898; G03G 15/0889; G03G 15/0891; G03G 15/0817; G03G 15/0881; G03G 2221/1648; G03G 15/0865
See application file for complete search history.

(56) References Cited

U.S. PATENT DOCUMENTS

| | | | | |
|---|---|---|---|---|
| 9,964,893 | B2 * | 5/2018 | Murata .............. | G03G 15/0872 |
| 2012/0321341 | A1 * | 12/2012 | Hori .................. | G03G 15/0872 399/110 |
| 2016/0033898 | A1 * | 2/2016 | Yamabe ............ | G03G 15/0877 399/258 |
| 2019/0041770 | A1 | 2/2019 | Kawano et al. | |
| 2022/0236665 | A1 | 7/2022 | Boettcher et al. | |

FOREIGN PATENT DOCUMENTS

| | | |
|---|---|---|
| JP | 2017-026934 A | 2/2017 |

OTHER PUBLICATIONS

European Search Report issued in connection with counterpart European Patent Application No. 25151647.2 on Jul. 3, 2025.

* cited by examiner

*Primary Examiner* — Joseph S Wong
(74) *Attorney, Agent, or Firm* — Rabin & Berdo, P.C.

(57) ABSTRACT

A developer storage body includes a frame body that stores a developer, and a rotating member a part of which is inserted into a hole portion provided in the frame body. The rotating member agitates or conveys the developer in the frame body. A seal member is held between the frame body and the rotating member in a direction of a rotation axis of the rotating member. The frame body has a contact surface in contact with the seal member. The contact surface has a first contact region in which a plurality of holes are formed and arranged in a circumferential direction, and first contact portions are each formed between two of the plurality of holes adjacent to each other.

13 Claims, 12 Drawing Sheets

DEVELOPER STORAGE BODY INCLUDING FRAME BODY HAVING CONTACT SURFACE WITH HOLES AND SEAL MEMBER CONTACTING CONTACT SURFACE

BACKGROUND OF THE INVENTION

1. Field of the Invention

The present disclosure relates to a developer storage body that stores a developer, and relates to an image forming unit and image forming apparatus including the developer storage body.

2. Description of the Related Art

There is known a developer storage body including a frame body that stores a developer, and a rotating member that agitates or conveys the developer in the frame body. Reference is made to Japanese Patent Application Publication No. 2017-26934 (see, for example, Summary).

In the conventional developer storage body, there is a possibility that the developer may leak through an end of the rotating member to the outside of the frame body.

The present disclosure is made to solve the above-described problem, and an object of the present disclosure is to suppress leakage of the developer.

SUMMARY OF THE INVENTION

A developer storage body of the present disclosure includes a frame body that stores a developer, and a rotating member a part of which is inserted into a hole portion provided in the frame body. The rotating member agitates or conveys the developer in the frame body. A seal member is held between the frame body and the rotating member in a direction of a rotation axis of the rotating member. The frame body has a contact surface in contact with the seal member. The contact surface has a first contact region in which a plurality of holes are formed and arranged in a circumferential direction, and first contact portions are each formed between two of the plurality of holes adjacent to each other.

According to the present disclosure, the holes formed in the first contact region of the contact surface of the frame body are brought into contact with the seal member, and restrict the movement the seal member. Thus, a sealing pressure between the seal member and the frame body can be kept constant, and a sealing pressure between the seal member and the rotating member can be kept constant. Thus, the leakage of the developer can be suppressed.

CONFIGURATION OF IMAGE FORMING APPARATUS 10

Figure 1:
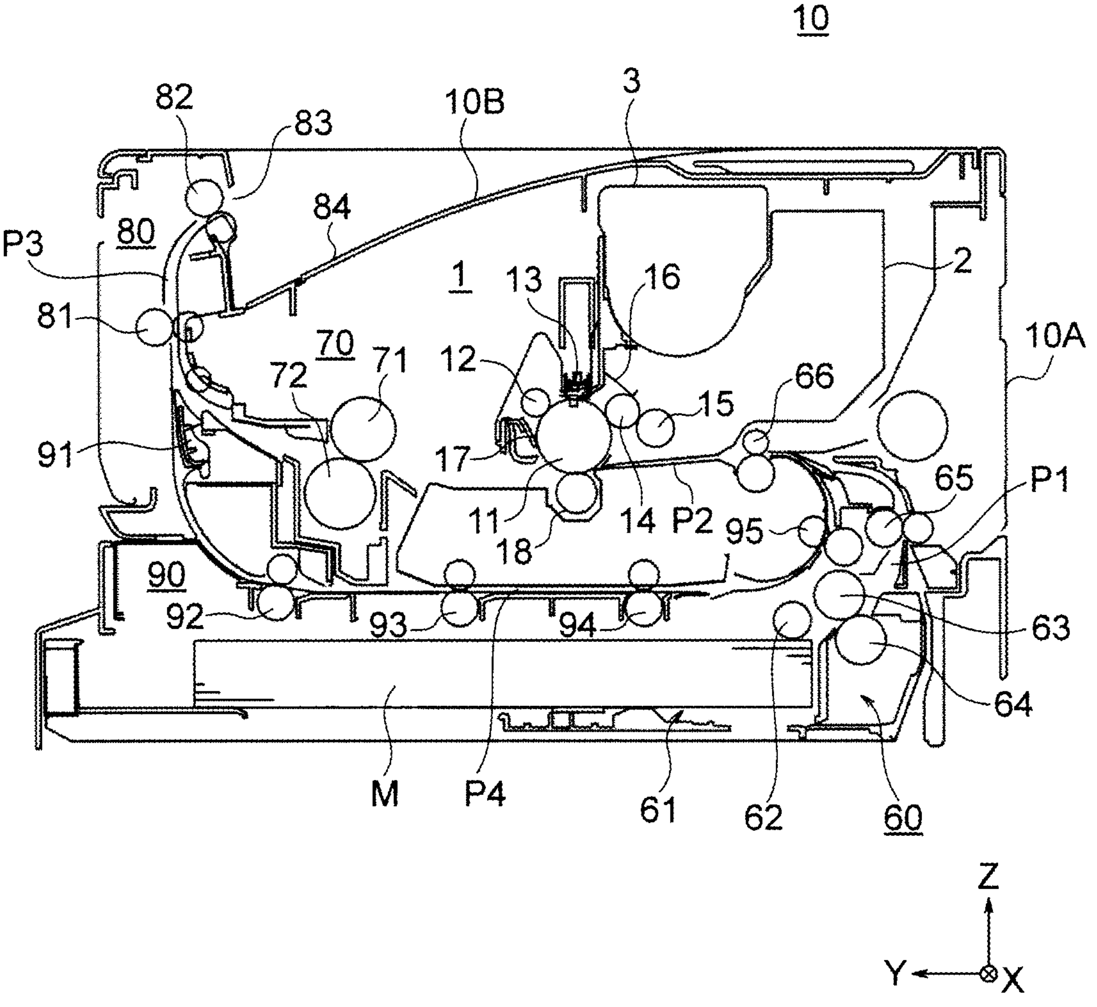
FIG. 1 is a diagram illustrating a configuration of an image forming apparatus in the embodiment.

First, an entire configuration of an image forming apparatus 10 in the embodiment will be described. FIG. 1 is a diagram illustrating the image forming apparatus 10. The image forming apparatus 10 shown in FIG. 1 is configured as a printer that forms an image using an electrophotographic process.

The image forming apparatus 10 includes a medium supply section 60 that supplies a medium M such as a printing sheet, an image forming unit 1 that forms an image, a fixing device (fuser) 70 that fixes the image to the medium M, a medium ejection section 80 that ejects the medium M, and an apparatus housing 10A in which these components are housed.

The medium supply section 60 includes a medium cassette 61, a pickup roller 62, a feed roller 63, a retard roller 64, a pair of registration rollers 65, and a pair of transport rollers 66.

The medium cassette 61 stores the media M such as printing sheets. The pickup roller 62 picks up the uppermost medium M in the medium cassette 61. The feed roller 63 and the retard roller 64 send out the medium M to a transport path P1 while separating the medium M from the remaining media M.

The registration rollers 65 correct the skew of the medium M, which has been sent out to the transport path P1, and further transport the medium M. The transport rollers 66 transport the medium M to the image forming unit 1 along the transport path P2.

The image forming unit 1 is also referred to as an image drum unit (ID unit), a process unit, or a development device. The image forming unit 1 includes a unit main body 2 as a main body part, and a toner cartridge 3 as a developer storage body.

The unit main body 2 includes the photosensitive drum 11 as an image bearing body, a charging roller 12 as a charging member, a developing roller 14 as a developer bearing body, a supply roller 15 as a supply member, a developing blade 16 as a layer regulation member, and a cleaning member 17.

The photosensitive drum 11 is a cylindrical member including a conductive support body and a photosensitive layer formed on the surface of the conductive support body. The photosensitive layer has a layered structure including charge generation layers and charge transport layers. The photosensitive drum 11 rotates clockwise in FIG. 1 by rotation transmitted from a not-shown drum motor.

An exposure head 13 as an exposure device is disposed so as to face the photosensitive drum 11. The exposure head 13 includes an LED (Light Emitting Diode) array including LEDS (serving as light emitting elements) and a lens array. The exposure head 13 emits light to irradiate the surface of the photosensitive drum 11 so as to form an electrostatic latent image. The exposure head 13 is supported by being suspended from a top cover 10B covering the upper part of the apparatus housing 10A.

The charging roller 12 is disposed in contact with the surface of the photosensitive drum 11, and rotates following the rotation of the photosensitive drum 11. The charging roller 12 includes a metal shaft (core), a resilient layer formed on the surface of the metal shaft, and a surface layer formed on the surface of the resilient layer. The charging roller 12 is applied with a charging voltage, and uniformly charges the surface of the photosensitive drum 11.

The developing roller 14 is disposed in contact with the surface of the photosensitive drum 11, and rotates in a direction opposite to the photosensitive drum 11 (so that the surfaces of the developing roller 14 and the photosensitive drum 11 at a contact portion therebetween move in the same direction). The developing roller 14 includes a metal shaft, and a resilient layer formed on the surface of the metal shaft. The developing roller 14 is applied with a developing voltage, and develops the electrostatic latent image on the surface of the photosensitive drum 11 with a toner (developer).

The supply roller 15 is disposed in contact with the surface of the developing roller 14, and rotates in the same direction as the developing roller 14 (so that the surfaces of the supply roller 15 and the developing roller 14 at a contact portion therebetween move in the opposite directions). The supply roller 15 includes a metal shaft and a resilient layer formed on the surface of the metal shaft.

The developing blade 16 is made of a bent metal plate. A bent portion of the developing blade 16 is pressed against the surface of the developing roller 14. The developing blade 16 regulates the thickness of a toner layer (developer layer) on the surface of the developing roller 14.

The cleaning member 17 is, for example, a blade or roller made of resin and is disposed in contact with the surface of the photosensitive drum 11. The cleaning member 17 removes the toner (residual toner) remaining on the surface of the photosensitive drum 11 after transfer of the toner image described later.

The transfer roller 18 as a transfer portion is disposed in contact with the surface of the photosensitive drum 11. The transfer roller 18 includes a metal shaft and a semiconductive resilient layer formed on the surface of the metal shaft. The transfer roller 18 is applied with a transfer voltage, and transfers the toner image from the surface of the photosensitive drum 11 to the medium M that passes through between the photosensitive drum 11 and the transfer roller 18.

The fixing device 70 is disposed on a downstream side of the image forming unit 1 in the transport direction of the medium M. The fixing device 70 includes a fixing roller 71 and a pressure roller 72. The fixing roller 71 has therein a heater such as a halogen lamp. The pressure roller 72 is pressed against the fixing roller 71 to form a fixing nip. The fixing roller 71 and the pressure roller 72 apply heat and pressure to the medium M to fix the toner image to the medium M.

The medium ejection section 80 includes a pair of ejection rollers 81 and a pair of ejection rollers 82 that transport the medium M (having passed through the fixing device 70) along the transport path P3 and eject the medium M through an outlet port 83. A stacker portion 84 on which the ejected media M are placed is formed on the top cover 10B.

Moreover, the image forming apparatus 10 may include a re-transport section 90 that reverses and transports (re-transports) the medium M, on which the toner image has been fixed, to the transport rollers 66 for double-sided printing. In this case, a re-transport path P4 is branched from the transport path P3, and a selector 91 is provided for switching the transport direction.

The ejection rollers 81 and 82 rotate in a regular direction to draw the medium M into the transport path P3, and then rotate in a reverse direction to send out the medium M from the transport path P3. The selector 91 guides the medium M sent out from the transport path P3 to the re-transport path P4. The transport rollers 92, 93, 94, and 95 are arranged along the re-transport path P4, and transport the medium M along the re-transport path P4. The re-transport path P4 merges with the transport path P1 on the upstream side of the transport rollers 66.

In FIG. 1, an axial direction of the photosensitive drum 11 is defined as an X direction. The X direction is an axial direction of each of the rollers in the image forming apparatus 10, and is also a width direction of the medium M to be transported. A moving direction of the medium M when the medium M passes through the image forming unit 1 is defined as a Y direction. A direction perpendicular to the X direction and the Y direction is defined as a Z direction. In this example, the Z direction is a vertical direction.

The image forming apparatus 10 is configured to form a monochrome image by means of the image forming unit 1. However, the image forming apparatus 10 is not limited to such a configuration. For example, the image forming apparatus 10 may include a plurality of image forming units of colors such as yellow, magenta, cyan, and black arranged in the transport direction of the medium M, and may be configured to form a color image. In such a case, it is also possible to employ a transfer unit including transfer rollers and a transfer belt.

Configuration of Image Forming Unit 1

Figure 2A:
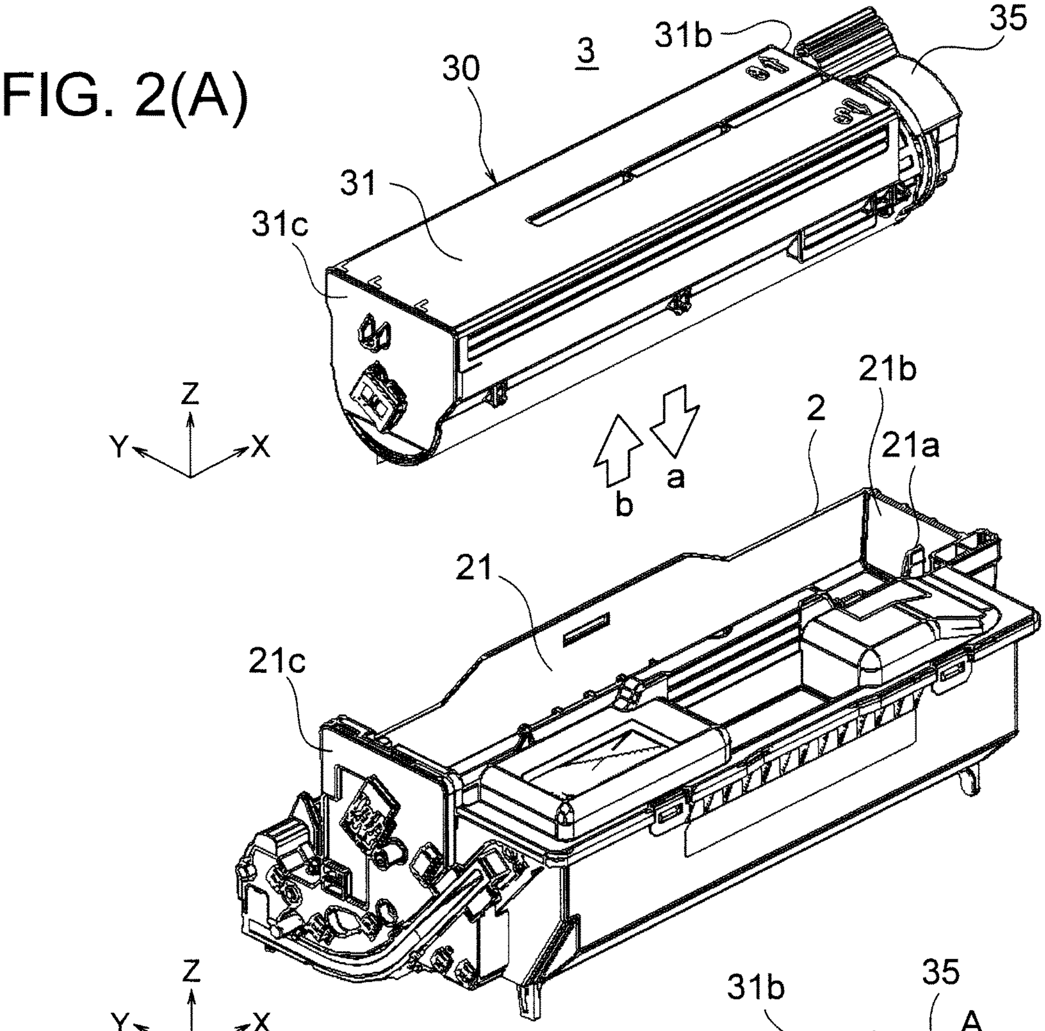
FIG. 2(A) is a perspective view illustrating a toner cartridge and a unit main body in the embodiment.

Next, the configuration of the image forming unit 1 will be further described. FIG. 2(A) is a perspective view illustrating the unit main body 2 and the toner cartridge 3 of the image forming unit 1.

As shown in FIG. 2(A), the image forming unit 1 includes the unit main body 2 and the toner cartridge 3 detachably mounted to the unit main body 2. The toner cartridge 3 has a frame body 30 that stores a toner as a developer, and an operation lever 35 provided at an end in the +X direction of the frame body 30.

A mounting portion 21 to which the toner cartridge 3 is to be mounted is provided on the unit main body 2. The mounting portion 21 includes a wall portion 21*b* in the +X direction, and a wall portion 21*c* in the −X direction. A rib 21*a* which serves as an engagement portion is formed on the wall portion 21*b*.

Figure 2B:
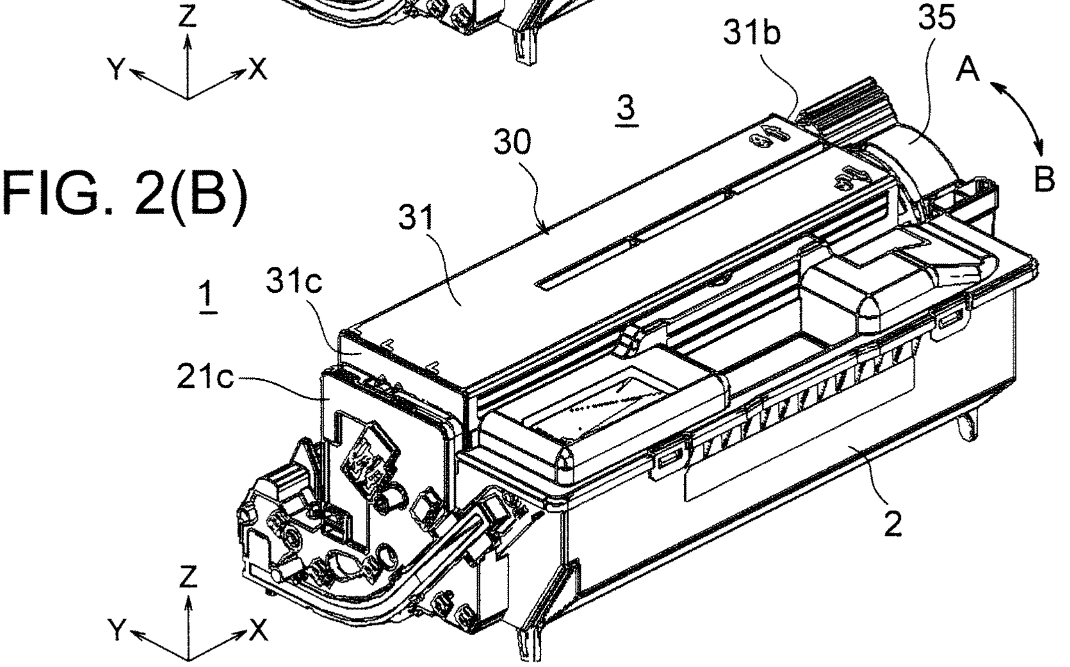
FIG. 2(B) is a perspective view illustrating an image forming unit in the embodiment.

FIG. 2(B) is a perspective view illustrating a state where the toner cartridge 3 is mounted to the unit main body 2. As shown in FIG. 2(B), the toner cartridge 3 is mounted to the mounting portion 21 of the unit main body 2.

In this state, the rib 21*a* (FIG. 2(A)) in the mounting portion 21 is engaged with a groove (not shown) formed in the operation lever 35 of the toner cartridge 3, and locks the toner cartridge 3 so that the toner cartridge 3 is not detached from the mounting portion 21.

Figure 3:
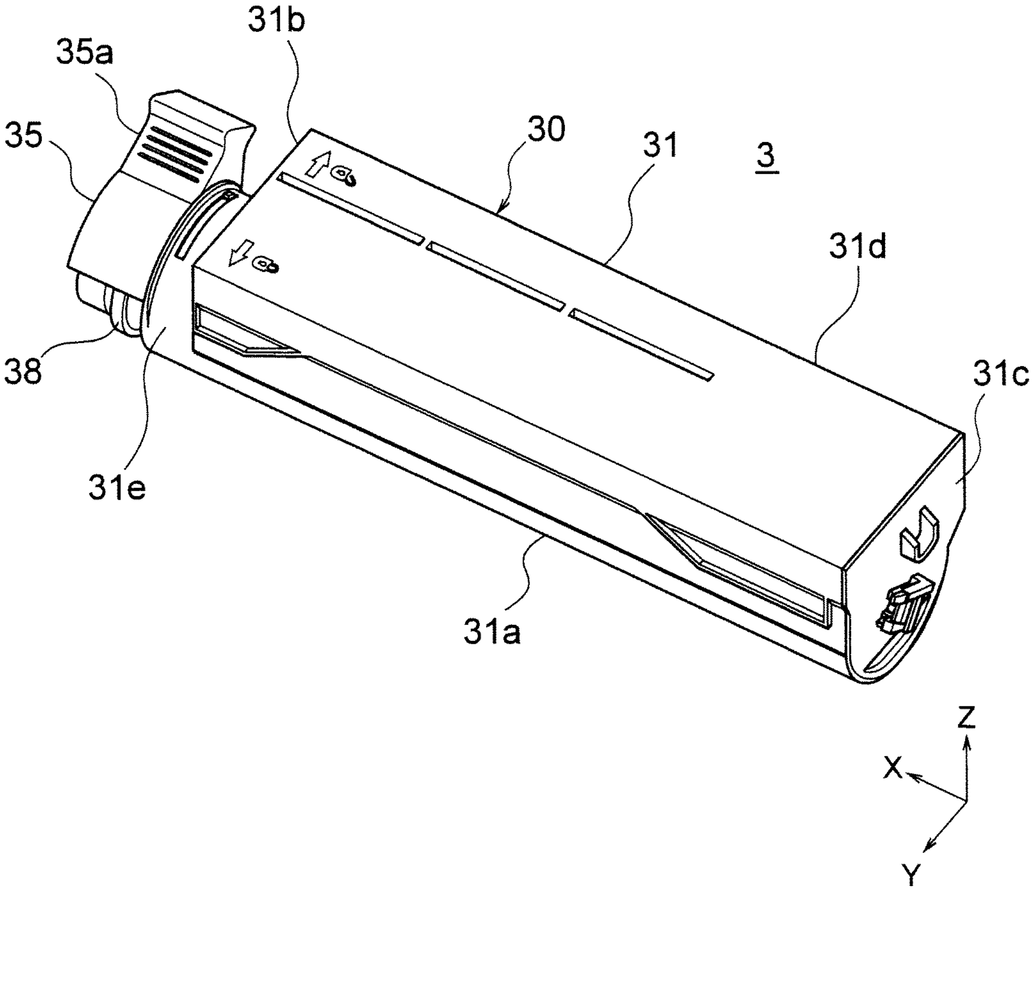
FIG. 3 is a perspective view illustrating the toner cartridge in the embodiment.
Figure 4A:
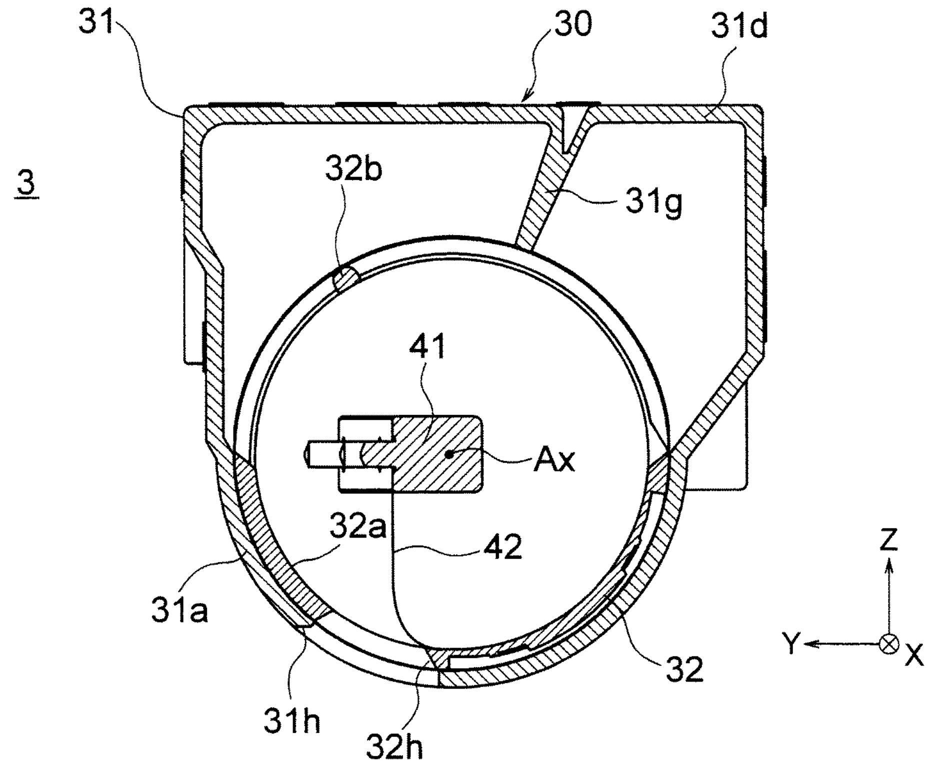
FIGS. 4(A) and 4(B) are sectional views illustrating the toner cartridge in the embodiment.
Figure 4B:
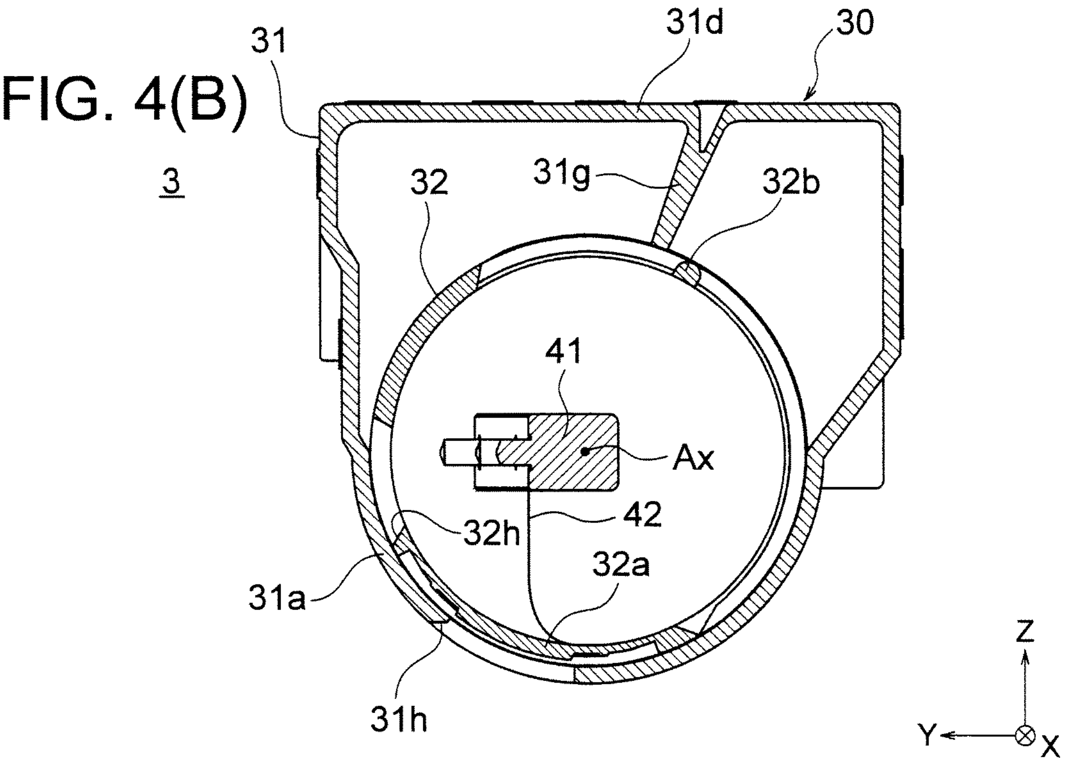

FIG. 3 is a perspective view illustrating the entire toner cartridge 3. FIG. 4(A) is a sectional view illustrating a state where a toner supply opening 31*h* (described later) of the toner cartridge 3 is opened. FIG. 4(B) is a sectional view illustrating a state where the toner supply opening 31*h* of the toner cartridge 3 is closed.

As shown in FIG. 3, the toner cartridge 3 is entirely elongated in the X direction. As shown in FIG. 4(A), the frame body 30 of the toner cartridge 3 includes an outer case 31 as an outer housing and an inner case 32 as an inner housing (or an opening-and-closing member) provided inside the outer case 31.

The outer case 31 has a case lower portion 31*a* having a substantially semicylindrical shape about a rotation axis Ax in the X direction, and a case upper portion 31*d* having a substantially rectangular parallelepiped shape. The toner supply opening 31*h* as a developer supply opening is formed on the case lower portion 31*a*.

Figure 5A:
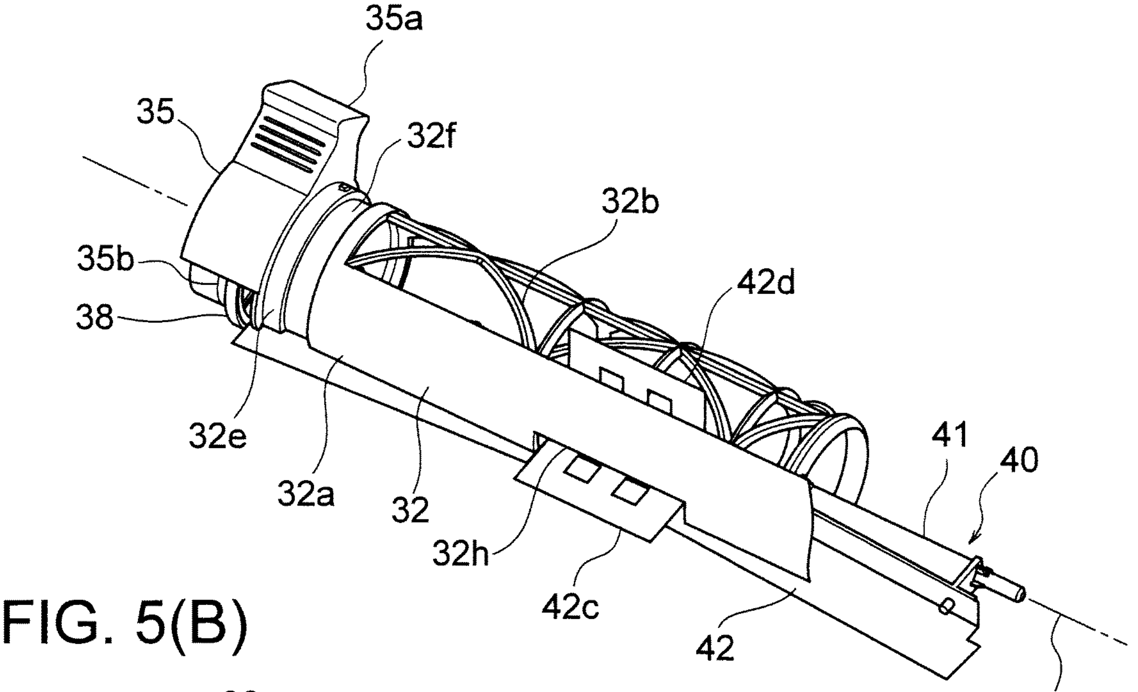
FIG. 5(A) is a perspective view illustrating an inner case, an operation lever, and an agitation bar in the embodiment.

The inner case 32 has a bottom wall portion 32*a* having a semicylindrical shape about the rotation axis Ax, and a plurality of beams 32*b* (see FIG. 5(A)) provided on the side (upper side in FIGS. 4(A) and 4(B)) opposite to the bottom wall portion 32*a* with respect to the rotation axis Ax. The plurality of beams 32*b* extend to form a trussed structure.

The bottom wall portion 32*a* of the inner case 32 is provided in contact with an inner circumferential surface of the case lower portion 31*a* of the outer case 31. The inner case 32 is pressed against the inner circumferential surface of the case lower portion 31*a* of the outer case 31 by a protrusion 31*g* extending from the case upper portion 31*d* of the outer case 31. That is, the inner case 32 is held in the outer case 31 so as to be rotatable about the rotation axis Ax.

An opening 32*h* corresponding to the toner supply opening 31*h* of the outer case 31 is formed in the bottom wall portion 32*a* of the inner case 32. As shown in FIG. 4(A), when the opening 32*h* of the inner case 32 and the toner supply opening 31*h* of the outer case 31 overlap with each other, the toner supply opening 31*h* is opened.

In contrast, as shown in FIG. 4(B), when the opening 32*h* of the inner case 32 and the toner supply opening 31*h* of the outer case 31 do not overlap with each other, the toner supply opening 31*h* is closed by the bottom wall portion 32*a* of the inner case 32.

As shown in FIG. 3, the outer case 31 has a wall portion 31*b* in the +X direction, and a wall portion 31*c* in the −X direction. A cylindrical portion 31*e* is formed on the wall portion 31*b* of the outer case 31 and protrudes in the +X direction. The cylindrical portion 31*e* has a cylindrical shape about the rotation axis Ax.

Figure 5B:
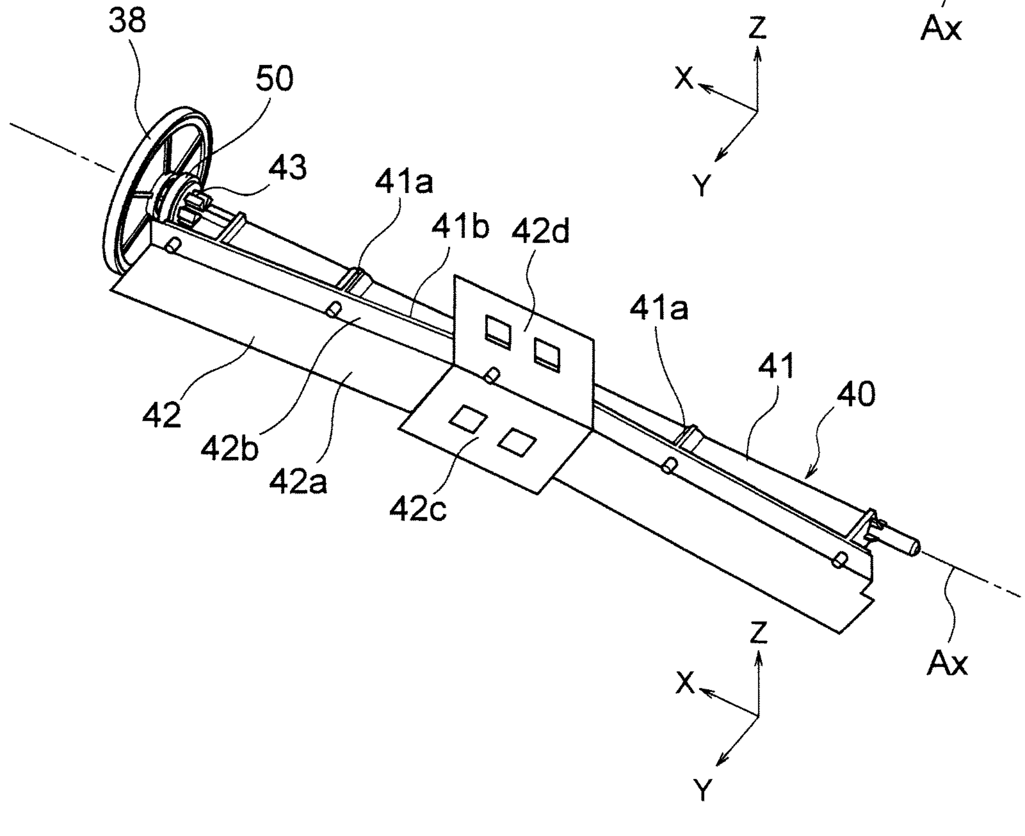
FIG. 5(B) is a perspective view illustrating the agitation bar and a gear in the embodiment.

FIG. 5(A) is a perspective view illustrating the inner case 32, the operation lever 35, and an agitation bar 40 (described later) of the toner cartridge 3. FIG. 5(B) is a perspective view illustrating the agitation bar 40 and a gear 38 (described later).

As shown in FIG. 5(A), the inner case 32 has a cylindrical portion 32*e* located in the +X direction with respect to the bottom wall portion 32*a* and the beams 32*b*. The cylindrical portion 32*e* has a cylindrical shape about the rotation axis Ax. The cylindrical portion 32*e* of the inner case 32 is held inside the cylindrical portion 31*e* (FIG. 3) of the outer case 31. Moreover, the cylindrical portion 32*e* of the inner case 32 protrudes in the +X direction from the cylindrical portion 31*e* of the outer case 31.

The operation lever 35 is integrally formed at the end in the +X direction of the cylindrical portion 32*e* of the inner case 32. The operation lever 35 is a portion to be rotated by the user, and has a grip portion 35*a*. When the operation lever 35 is operated, the inner case 32 rotates about the rotation axis Ax, and opens and closes the toner supply opening 31*h* (FIGS. 4(A) and (B)).

Moreover, an annular groove portion 32*f* is formed on the cylindrical portion 32*e* of the inner case 32. An engagement portion 31*f* (FIG. 6(A)) of the outer case 31 is engaged with the groove portion 32*f* of the cylindrical portion 32*e*, and the leakage of the toner through the gap between the cylindrical portions 31*e* and 32*e* is prevented.

The agitation bar 40 as a rotating member is provided inside the inner case 32. The agitation bar 40 includes an agitating shaft 41 extending in the X direction, a flexible agitation film 42 attached to the agitation shaft 41, and a support member 43 fixed to an end of the agitation shaft 41 in the +X direction. A central axis of the agitation shaft 41 is in aligned with the rotation axis Ax.

FIG. 5(B) is a perspective view illustrating the agitation bar 40 and the gear 38. Ribs 41*a* are formed on the agitation shaft 41 of the agitation bar 40 at a plurality of positions in the X direction. Each rib 41*a* extends in a direction perpendicular to the rotation axis Ax. A support plate 41*b* elongated in the X direction is attached to the tips of the ribs 41*a*.

The agitation film 42 is fixed to the support plate 41*b* of the agitation shaft 41. The agitation film 42 has an attachment portion 42*b* fixed to the support plate 41*b*, and an extending portion 42*a* which is bent at substantially 90 degrees with respect to the attachment portion 42*b*.

When the agitation shaft 41 of the agitation bar 40 rotates, the agitation film 42 rotates in contact with the inner circumferential surface of the inner case 32 and agitates the toner. Moreover, the support plate 41*b* of the agitation shaft 41 is slightly curved with respect to the X direction, and conveys the toner toward the opening 32*h* formed at the center in the X direction of the inner case 32.

A central portion 42*c* in the X direction of the extending portion 42*a* of the agitation film 42 has a length in the radial direction about the rotation axis Ax which is longer than any other portion of the extending portion 42*a*. Similarly, a central portion 42*d* in the X direction of the attachment portion 42*b* of the agitation film 42 has a length in the radial direction which is longer than any other portion of the attachment portion 42*b*.

Therefore, as shown in FIG. 5(A), the central portion 42*c* of the extending portion 42*a* protrudes through the opening 32*h* of the inner case 32, and surely ejects the toner through the opening 32*h*. Same can be said to the central portion 42*d* of the attachment portion 42*b*.

In FIG. 5(A), the agitation film 42 is illustrated to penetrate the inner case 32 and protrude outward radially.

However, the agitation film 42 is located inside the inner case 32 except for the central portions 42*c* and 42*d*.

As shown in FIG. 5(B), the gear 38 as a power transmission member (rotation transmission member) is attached to the end in the +X direction of the agitation shaft 41 of the agitation bar 40 via the support member 43. The gear 38 is located inside the operation lever 35 as shown in FIG. 5(A), and exposed to outside through an opening 35*b* formed in the operation lever 35.

A rotation of a drum gear (not shown) attached to the photosensitive drum 11 (FIG. 1) is transmitted to the gear 38. The rotation of the gear 38 is transmitted to the agitation shaft 41 through the support member 43 of the agitation bar 40, and the agitation bar 40 rotates about the rotation axis Ax, so that the agitation film 42 rotates in contact with the inner circumferential surface of the inner case 32 as described above.

Figure 6B:
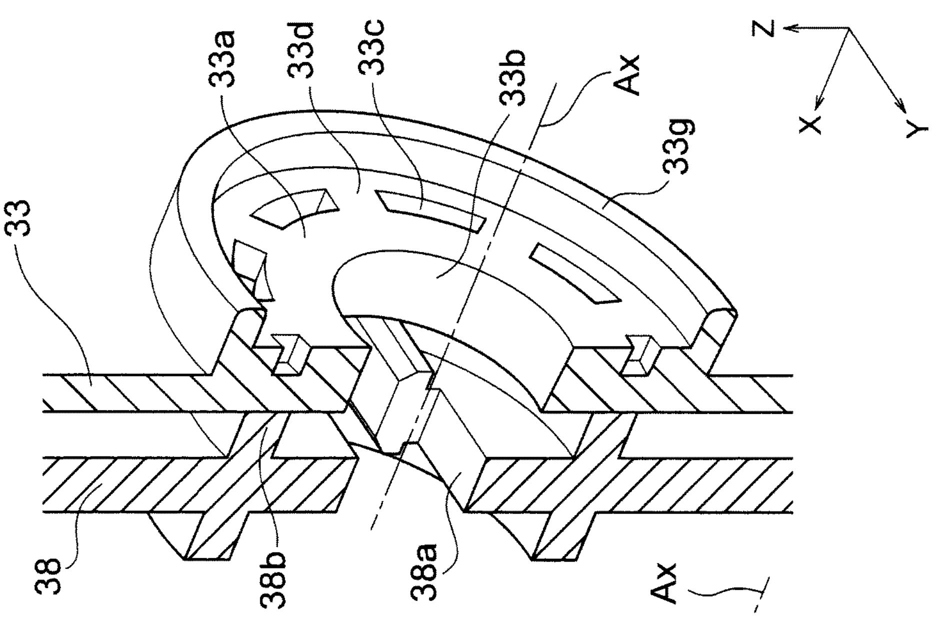
FIG. 6(B) is an enlarged perspective view illustrating a contact surface of the frame body and its surroundings in the embodiment.
Figure 6A:
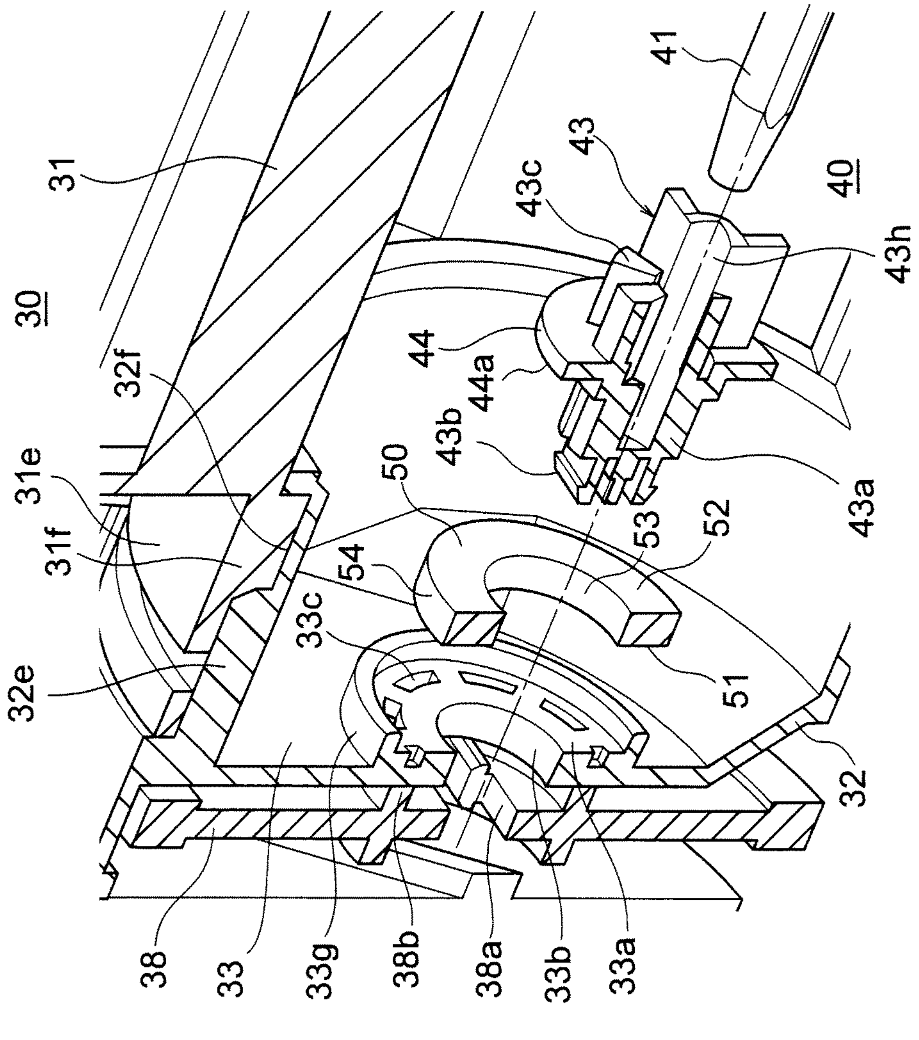
FIG. 6(A) is a perspective view illustrating a state before the agitation bar is attached to the frame body of the toner cartridge in the embodiment.

FIG. 6(A) is a perspective view illustrating a state before the agitation bar 40 is attached to the inner case 32. A wall portion 33 is formed on an end in the +X direction of the inner case 32 (i.e., an end in the +X direction of the cylindrical portion 32*e*). The wall portion 33 extends perpendicularly to the rotation axis Ax.

A hole portion 33*b* into which a part of the support member 43 of the agitation bar 40 (FIGS. 5(A) and (B)) is inserted is formed in the wall portion 33 of the inner case 32. The hole portion 33*b* has a circular cross section, for example, and the center of the hole portion 33*b* is aligned with the rotation axis Ax.

A contact surface 33*a* is formed around the hole portion 33*b* on a surface in the −X direction of the wall portion 33 of the inner case 32. The contact surface 33*a* is a surface in contact with a seal member 50 described later. Although the contact surface 33*a* is a flat surface perpendicular to the rotation axis Ax in this example, the contact surface 33*a* is not limited to a flat surface.

Moreover, a peripheral wall portion 33*g* having an annular shape about the rotation axis Ax is formed on the wall portion 33 so that the peripheral wall portion 33*g* protrudes in the −X direction. The peripheral wall portion 33*g* is a portion in contact with an outer circumferential surface 54 of the seal member 50 described later.

The support member 43 of the agitation bar 40 includes a shaft portion 43*a* inserted in the hole portion 33*b* of the wall portion 33, and a hook portion 43*b* formed at the end in the +X direction of the shaft portion 43*a*. A center axis of the shaft portion 43*a* is aligned with the rotation axis Ax. A center hole 43*h* is formed in the shaft portion 43*a*. The tip of the agitation shaft 41 is fitted into the center hole 43*h*.

Figures 7A, 7B:
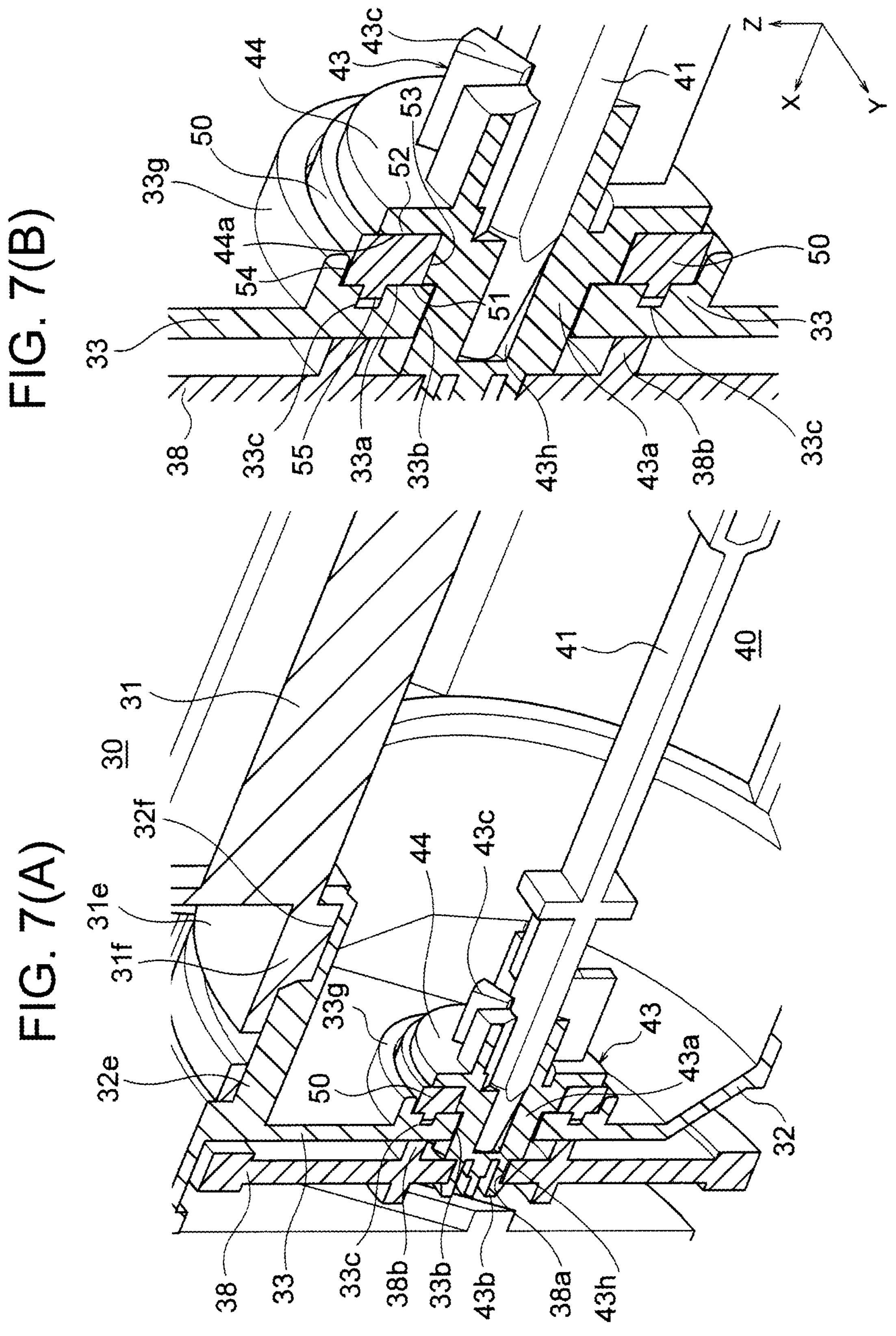
FIG. 7(A) is a perspective view illustrating a state where the agitation bar is attached to the frame body of the toner cartridge in the embodiment.
FIG. 7(B) is an enlarged perspective view illustrating a seal member and its surroundings in the embodiment.

The shaft portion 43*a* of the support member 43 passes through the hole portion 33*b* of the wall portion 33, and the hook portion 43*b* at the tip of the shaft portion 43*a* is engaged with an engagement hole 38*a* formed at the center of the gear 38 (see FIG. 7(A)). The gear 38 and the support member 43 are fixed to each other by engagement of the hook portion 43*b* and the engagement hole 38*a*.

The support member 43 includes an abutting portion 44 extending radially outward from the shaft portion 43*a*. Although the abutting portion 44 has a plate shape in this example, the abutting portion 44 may have another shape. The abutting portion 44 has a contact surface 44*a* that faces the contact surface 33*a* of the wall portion 33 in the direction of the rotation axis Ax (hereinafter, referred to simply as an axial direction).

The support member 43 has a plurality of engagement pieces 43*c* protruding in the −X direction from the abutting portion 44. The engagement pieces 43*c* are engaged with the agitation shaft 41 in the circumferential direction about the rotation axis Ax, so that the support member 43 and the agitation shaft 41 (and the agitation film 42 attached thereto) rotate together.

The seal member 50 is provided between the contact surface 33*a* of the wall portion 33 and the contact surface 44*a* of the abutting portion 44 in the axial direction. The seal member 50 is a resilient member such as sponge, for example. The seal member 50 is desirably made of a material such as urethane resin or rubber, for example.

The seal member 50 is a member having an annular shape about the rotation axis Ax. The thickness direction of the seal member 50 is the direction of the rotation axis Ax (that is, the axial direction). A hole 53 is formed at the center of the seal member 50, and the shaft portion 43*a* of the support member 43 of the agitation bar 40 is inserted into the hole 53.

In a state before the shaft portion 43*a* of the support member 43 is inserted into the hole 53, the inner diameter of the hole 53 is desirably smaller than the outer diameter of the shaft portion 43*a*. When the shaft portion 43*a* of the support member 43 is inserted into the hole 53 of the seal member 50, the shaft portion 43*a* of the support member 43 is brought into tight contact with the hole 53.

The seal member 50 has a first surface 51 in contact with the contact surface 33*a* of the wall portion 33, a second surface 52 in contact with the abutting portion 44 of the support member 43. The first surface 51 and the second surface 52 serve as sealing surfaces preventing the leakage of the toner to the outside of the frame body 30.

FIG. 6(B) is an enlarged view illustrating the contact surface 33*a* of the wall portion 33 shown in FIG. 6(A) and its surroundings. As shown in FIG. 6(B), a plurality of holes 33*c* are formed in the contact surface 33*a*. The holes 33*c* are arranged in the circumferential direction. Each hole 33*c* has a depth in the axial direction. Each hole 33*c* has a groove shape extending in the circumferential direction in this example, but the shape of the hole 33*c* is not limited to the groove shape.

FIG. 7(A) is a perspective view illustrating a state where the agitation bar 40 is attached to the inner case 32. As shown in FIG. 7(A), the tip of the agitation shaft 41 of the agitation bar 40 is engaged with the center hole 43*h* of the support member 43, so that the agitation bar 40 is fixed to the support member 43.

The shaft portion 43*a* of the support member 43 is inserted into the hole portion 33*b* of the wall portion 33 as described above. The shaft portion 43*a* of the support member 43 protrudes in the +X direction through the hole portion 33*b*, and the hook portion 43*b* at the tip of the shaft portion 43*a* is engaged with the engagement hole 38*a* of the gear 38. The gear 38 is fixed to the support member 43 by engagement of the engagement hole 38*a* and the hook portion 43*b*.

The gear 38 has a convex portion 38*b* protruding in the −X direction (i.e., toward the wall portion 33) and surrounding the engagement hole 38*a*. When the hook portion 43*b* of the support member 43 is engaged with the engagement hole 38*a* of the gear 38, the convex part 38*b* of the gear 38 is brought into contact with the wall portion 33.

FIG. 7(B) is an enlarged view illustrating the seal member 50 shown in FIG. 7(A) and its surroundings. The seal member 50 is held (sandwiched) between the contact surface 33*a* of the wall portion 33 and the contact surface 44*a* of the abutting portion 44 in the axial direction, and is compressed in the axial direction.

Since the seal member 50 is compressed in the axial direction, as shown in FIG. 7(B), the first surface 51 of the seal member 50 is brought into tight contact with the contact surface 33*a* of the wall portion 33, and the second surface 52 of the seal member 50 is brought into tight contact with the abutting portion 44 of the support member 43. In addition, portions (referred to as entry portions 55) of the seal member 50 facing the holes 33*c* of the wall portion 33 enter into the holes 33*c*.

The hole 53 at the center of the seal member 50 is brought into tight contact with the shaft portion 43*a* of the support member 43 as described above. Moreover, the outer circumferential surface 54 of the seal member 50 is brought into tight contact with the inner circumferential surface of the peripheral wall portion 33*g* formed on the wall portion 33.

Figure 8B:
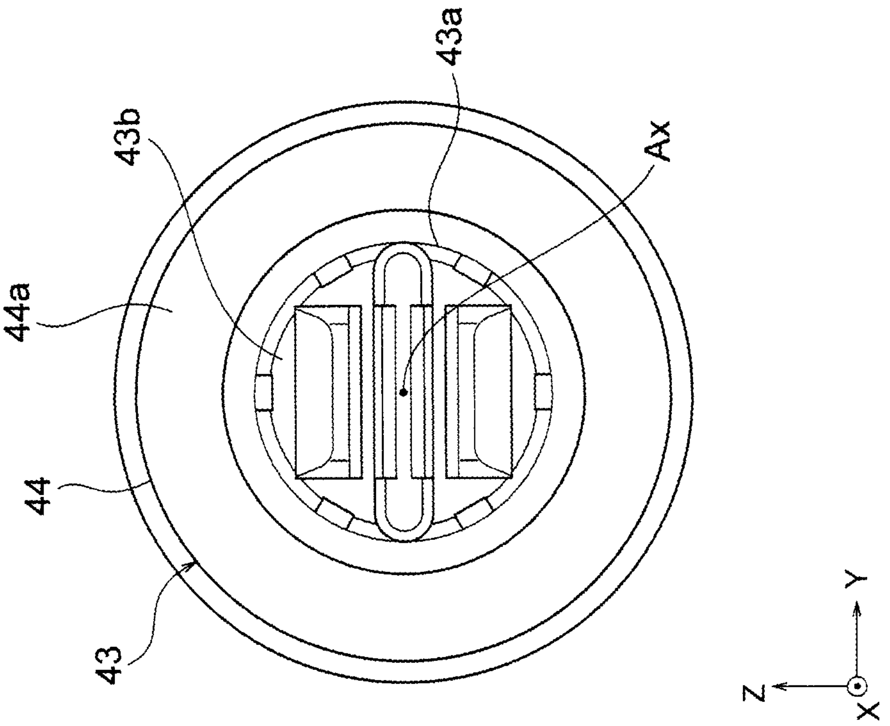
FIG. 8(B) is a front view illustrating a contact surface of an abutting portion of a support member in the embodiment.
Figure 8A:
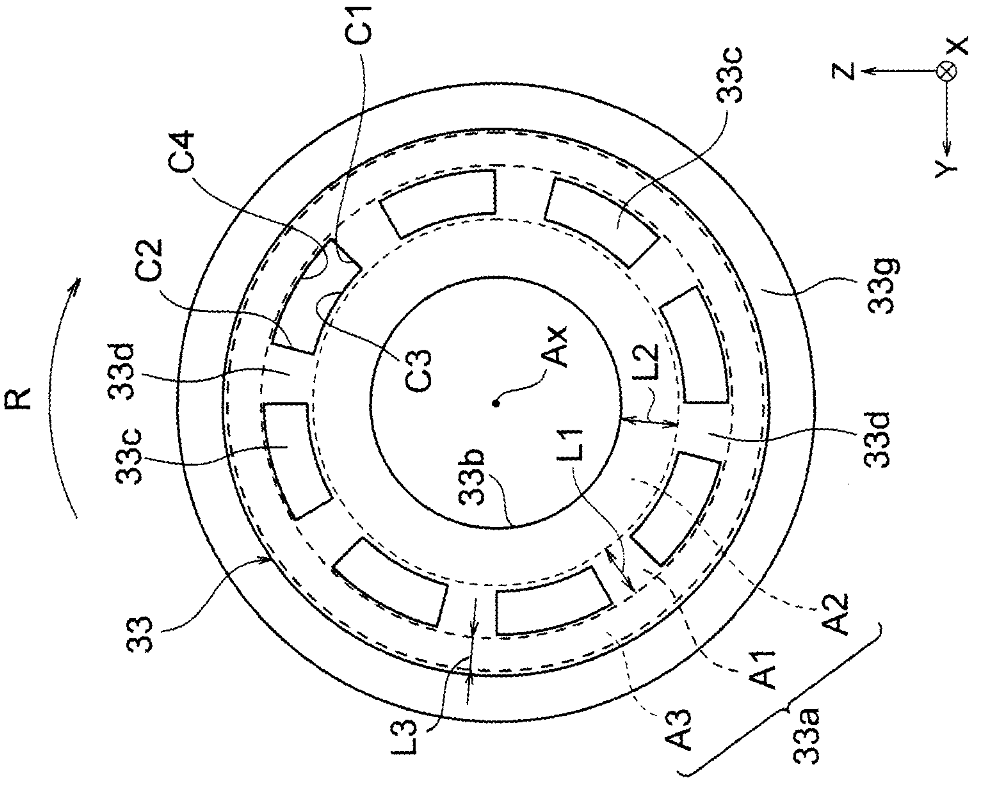
FIG. 8(A) is a front view illustrating the contact surface of the frame body of the toner cartridge in the embodiment.

FIG. 8(A) is a front view illustrating the contact surface 33*a* of the wall portion 33. As shown in FIG. 8(A), the plurality of holes 33*c* are formed in the contact surface 33*a* of the wall portion 33. The holes 33*c* are arranged at equal intervals in the circumferential direction. Although the number of the holes 33*c* is eight in this example, it is sufficient that the number of the holes 33*c* is two or more.

The contact surface 33*a* has three contact regions A1, A2, and A3 arranged in the radial direction. Among the contact regions A1, A2, and A3, the contact region A2 is formed on the innermost side in the radial direction, and the contact region A3 is formed on the outermost side in the radial direction. The contact region A1 is formed between the contact region A2 and the contact region A3 in the radial direction.

The contact region A1 has a length L1 in the radial direction, the contact region A2 has a length L2 in the radial direction, and the contact region A3 has a length L3 in the radial direction. Among the lengths L1, L2, and L3, the length L2 is the longest. That is, the length L2 is longer than the length L1 (L1<L2 is satisfied).

The above described holes 33*c* are formed in the contact region A1. In the contact surface 33*a* of the wall portion 33, the contact region A1 serves as the first contact region in which the holes 33*c* are formed.

In the example shown in FIG. 8(A), the holes 33*c* are formed in the contact region A1. In the contact region A1, contact portions 33*d* (serving as first contact portions) are each formed between two of the holes 33*c* adjacent to each other in the circumferential direction. The contact portions 33*d* are in contact with the seal member 50.

A rotating direction of the agitation bar 40 (i.e., rotating direction of the gear 38) is referred to as a rotating direction R. The hole 33*c* has a first end face C1 on the downstream side in the rotating direction R of the gear 38, a second end face C2 on the upstream side in the rotating direction R of the gear 38, a third end face C3 on the inner circumferential side, and a fourth end face C4 on the outer circumferential side.

When the gear 38 (FIG. 7(B)) rotates in the rotating direction R, the support member 43 (FIG. 7(B)) fixed to the gear 38 also rotates in the same rotating direction R, and the abutting portion 44 (FIG. 7(B)) that is a part of the support member 43 also rotates in the same rotating direction R. Therefore, the seal member 50 (FIG. 7(B)) in contact with the abutting portion 44 is forced to rotate in the rotating direction R.

At this time, the first end face C1 of the hole 33*c* of the wall portion 33 is applied with a force in the rotating direction R by the entry portion 55 of the seal member 50, and restricts the movement (rotation) of the seal member 50 in the rotating direction R. Therefore, the first end face C1 is also referred to as a receiving surface (or a facing surface, or a restriction surface).

FIG. 8(B) is a front view illustrating the contact surface 44*a* of the abutting portion 44 of the support member 43. As shown in FIG. 8(B), the contact surface 44*a* of the abutting portion 44 of the support member 43 is a smooth surface without holes or unevenness.

That is, the contact surface 44*a* of the abutting portion 44 of the support member 43 is desirably in tight contact with the second surface 52 (FIG. 7(B)) of the seal member 50, and a frictional force between the contact surface 44*a* and the second surface 52 is desirably as small as possible.

In this regard, in order to reduce the frictional force between the abutting portion 44 and the seal member 50, the contact surface 44*a* of the abutting portion 44 desirably has neither holes nor unevenness. The contact surface 44*a* is not necessarily a flat surface, but may be, for example, a loosely curved surface.

In the toner cartridge 3 in the embodiment, even if the seal member 50 is forced to rotate following the rotation of the gear 38, the rotation of the seal member 50 is restricted by the holes 33*c* formed in the contact surface 33*a* of the wall portion 33.

Therefore, the sealing pressure between the contact surface 33*a* of the wall portion 33 and the first surface 51 of the seal member 50 can be kept constant, and the sealing pressure between the second surface 52 of the seal member 50 and the contact surface 44*a* of the abutting portion 44 can also be kept constant. Thus, the leakage of the toner to the outside of the frame body 30 (i.e., the outer case 31 and the inner case 32) can be suppressed.

Operation of Image Forming Apparatus 10

Next, the operation (printing process) of the image forming apparatus 10 will be described with reference to FIG. 1. Upon receiving a print command and print data from a host device, a controller of the image forming apparatus 10 starts a printing process based on a print job contained in the print command.

When the printing process is started, the pickup roller 62 and the feed roller 63 of the medium supply section 60 rotate to send out the medium M from the medium cassette 61 one by one to the transport path P1. Further, the registration rollers 65 and the transport rollers 66 transport the medium M to the image forming unit 1 along the transport path P2.

In the image forming unit 1, the charging voltage, the development voltage, and the supply voltage are applied to the charging roller 12, the developing roller 14, and the supply roller 15, respectively. Moreover, the photosensitive drum 11, the developing roller 14, and the supply roller 15 rotate.

The charging roller 12 rotates following the rotation of to the photosensitive drum 11, and uniformly charges the surface of the photosensitive drum 11. The exposure head 13 emits light to expose the surface of the photosensitive drum 11 to form an electrostatic latent image.

In the unit main body 2, the toner supplied from the toner cartridge 3 is stored. The toner is supplied to the developing roller 14 by the supply roller 15. The toner on the surface of the developing roller 14 is formed into a thin layer by the developing blade 16.

The electrostatic latent image on the photosensitive drum 11 is developed with the toner on the developing roller 14, and turns into a toner image. The toner image on the photosensitive drum 11 is transferred to the medium M passing through between the photosensitive drum 11 and the transfer roller 18 by the transfer voltage applied to the transfer roller 18. The medium M to which the toner image is transferred is transported to the fixing device 70.

In the fixing device 70, the fixing roller 71 is heated to a predetermined fixing temperature, and the fixing nip is formed between the fixing roller 71 and the pressure roller 72. The medium M is applied with heat and pressure at the fixing nip between the fixing roller 71 and the pressure roller 72, and the toner image is fixed to the medium M. The medium M to which the toner image has been fixed is ejected through the outlet port 83 by the ejection rollers 81 and 82, and is stacked on the stacker portion 84.

In the above-described printing operation, the rotation of the photosensitive drum 11 is transmitted to the gear 38 (FIG. 5(B)) of the toner cartridge 3 through a gear train. When the gear 38 rotates, the agitation bar 40 fixed to the gear 38 rotates about the rotation axis Ax.

By the rotation of the agitation bar 40, the agitation film 42 agitates the toner within the frame body 30 (the outer case 31 and the inner case 32), and conveys the toner toward the opening 32*h* of the inner case 32. Thereby, the toner in the frame body 30 of the toner cartridge 3 is supplied to the unit main body 2 through the toner supply opening 31*h*, and is used for developing the above-described electrostatic latent image.

When the amount of the toner remaining in the image forming unit 1 becomes less than the predetermined amount, replacement of the toner cartridge 3 is performed by a user. In this case, the operation lever 35 shown in FIG. 2(B) is rotated in the direction shown by an arrow B. The inner case 32 is rotated by the rotation of the operation lever 35, and the bottom wall portion 32*a* of the inner case 32 closes the toner supply opening 31*h* of the outer case 31 as shown in FIG. 4(B).

Moreover, by the above-described rotation of the operation lever 35, the engagement between the groove portion (not shown) in the operation lever 35 and the rib 21*a* (FIG. 2(A)) of the unit main body 2 is released. In this state, by lifting the unit main body 2 as shown by an arrow b in FIG. 2(A), the toner cartridge 3 is detached from the mounting portion 21 of the unit main body 2.

Upon mounting new toner cartridge 3 to the unit main body 2, the toner cartridge 3 is mounted to the mounting portion 21 of the unit main body 2 as shown by an arrow a in FIG. 2(A). Furthermore, the operation lever 35 is rotated in a direction shown by an arrow A in FIG. 2(B). The inner case 32 rotates by the rotation of the operation lever 35, and the opening 32*h* of the inner case 32 and the toner supply opening 31*h* of the outer case 31 overlap with each other as shown in FIG. 4(A), so that the toner supply opening 31*h* is opened.

By the above-described rotation of the operation lever 35, the rib 21*a* in the unit main body 2 is engaged with the groove portion of the operation lever 35, and the toner cartridge 3 is locked to the unit main body 2. Thereby, the toner supply from the toner cartridge 3 to the unit main body 2 is enabled.

Action

Figure 9B:
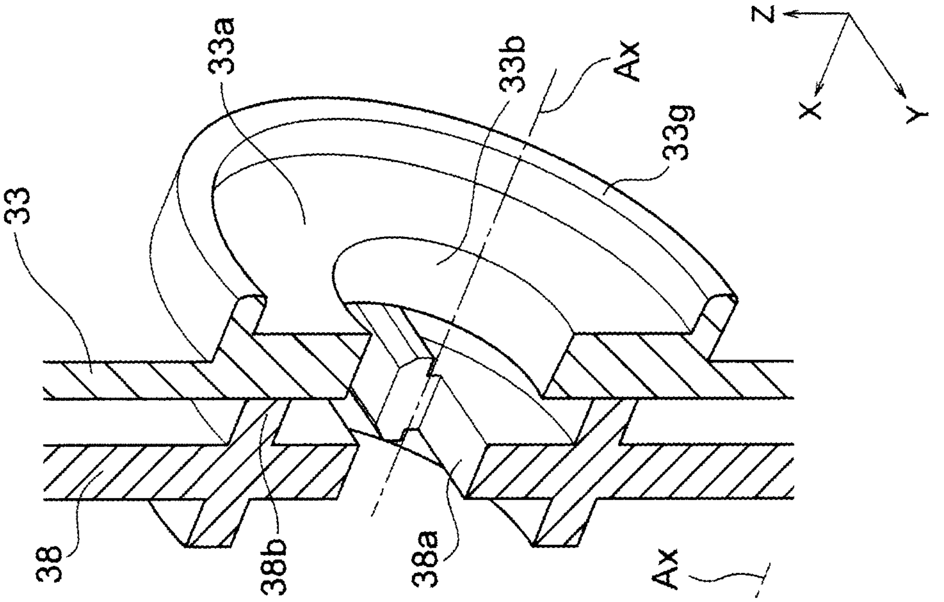
FIG. 9(B) is an enlarged perspective view illustrating a contact surface of the frame body and its surroundings in the comparison example.
Figure 9A:
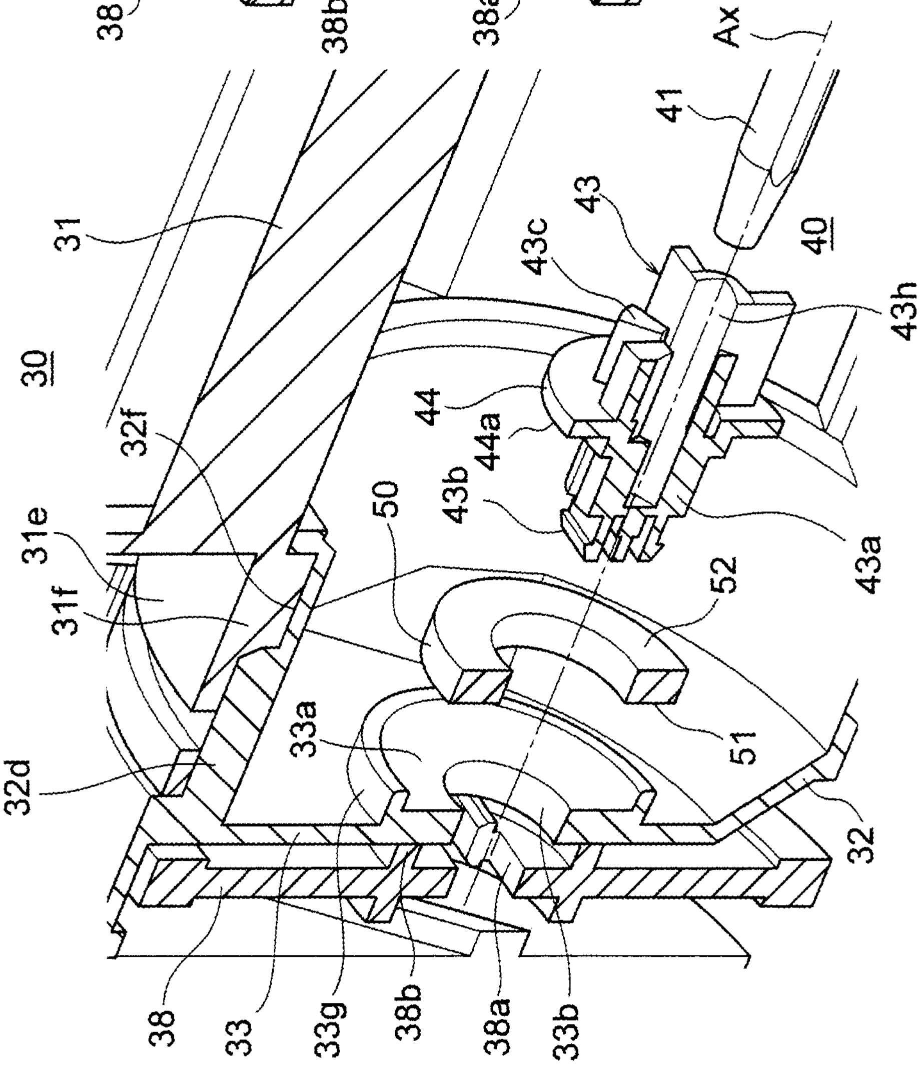
FIG. 9(A) is a perspective view illustrating a state before an agitation bar is attached to a frame body of a toner cartridge in a comparison example.

The action in the embodiment will be described as contrasted with a comparison example. FIG. 9(A) is a perspective view illustrating a state before the agitation bar 40 is attached to the inner case 32 of the toner cartridge in the comparison example. FIG. 9(B) is an enlarged view illustrating the contact surface 33*a* of the wall portion 33 shown in FIG. 9(A) and its surroundings. For the convenience's sake, components of the toner cartridge in the comparison example are assigned with the same reference numerals as the components of the toner cartridge 3 in the embodiment.

Figure 10B:
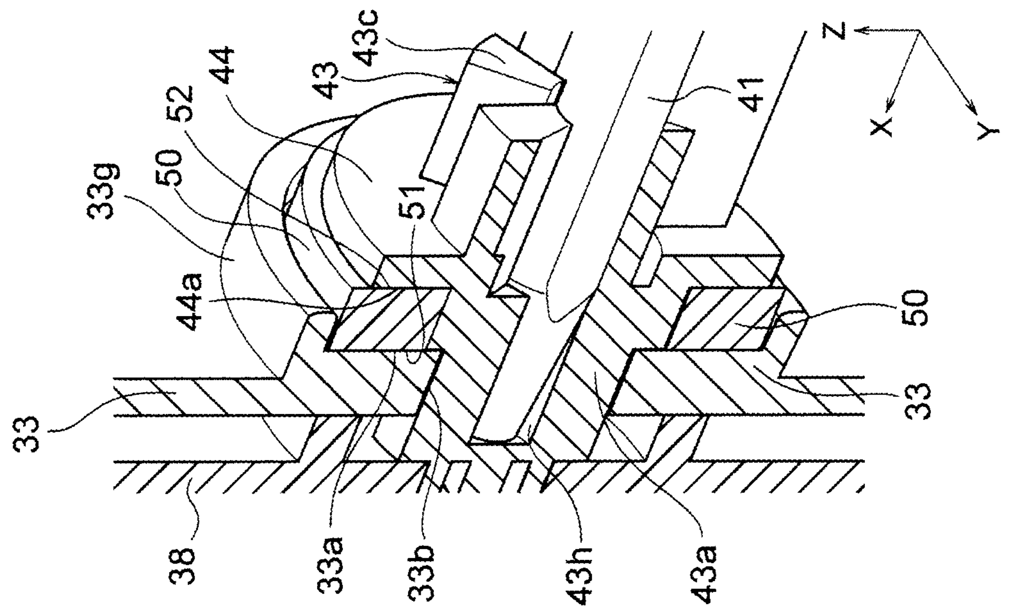
FIG. 10(B) is an enlarged perspective view illustrating a seal member and its surroundings in the comparison example.
Figure 10A:
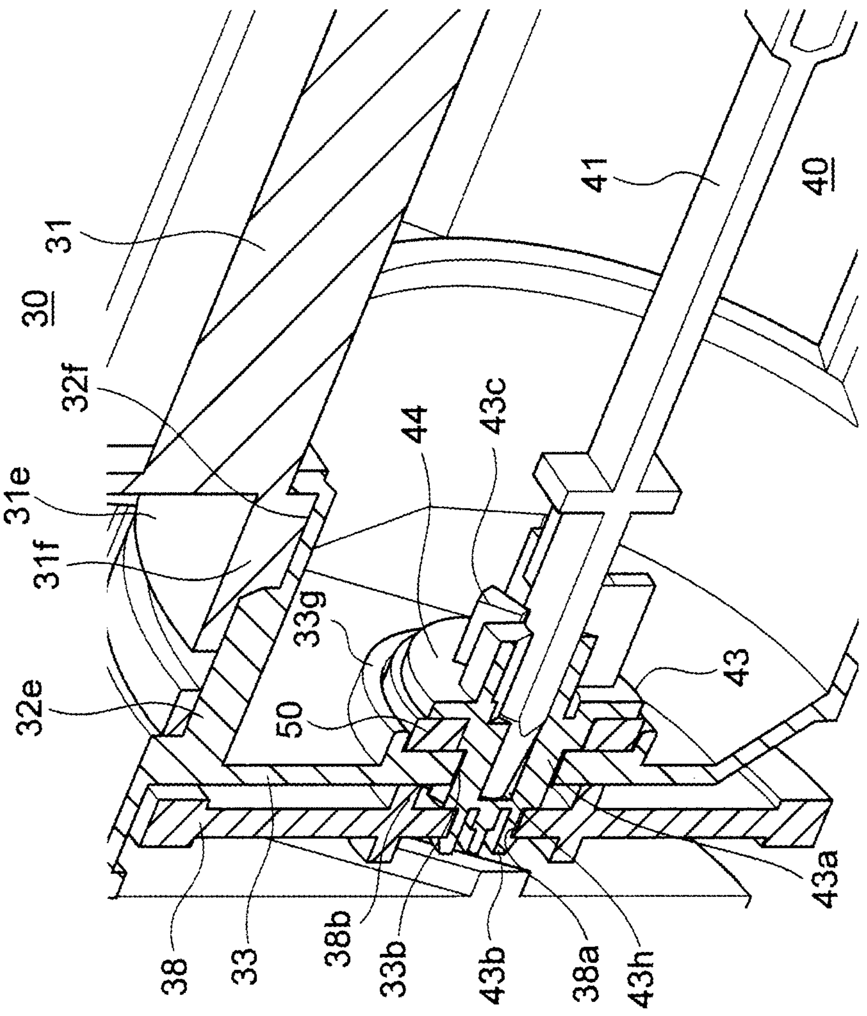
FIG. 10(A) is a perspective view illustrating a state where the agitation bar is attached to the frame body of the toner cartridge in the comparison example.
Figure 11:
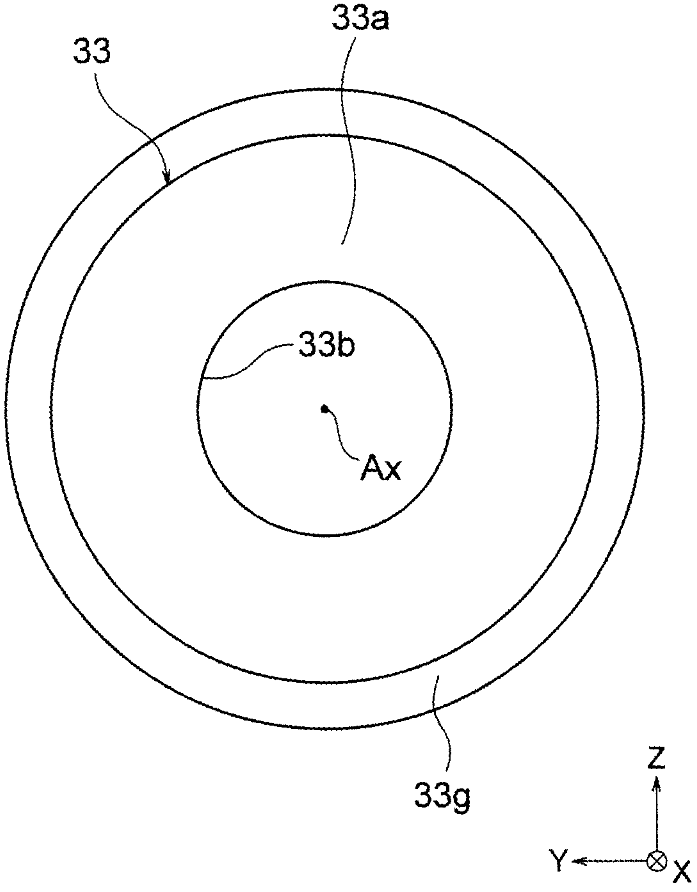
FIG. 11 is a front view illustrating the contact surface of the frame body of the toner cartridge in the comparison example.

FIG. 10(A) is a perspective view illustrating a state where the agitation bar 40 is attached to the inner case 32 of the toner cartridge in the comparison example. FIG. 10(B) is an enlarged view illustrating the seal member 50 shown in FIG. 10(A) and its surroundings. FIG. 11 is a front view illustrating the contact surface 33*a* of the wall portion 33 of the toner cartridge in the comparison example.

As shown in FIGS. 9(A) and 9(B) and FIG. 11, no hole 33*c* is formed in the contact surface 33*a* of the wall portion 33 of the toner cartridge in the comparison example. The toner cartridge in the comparison example is configured in a similar manner to the toner cartridge 3 in the embodiment in other respects.

When the shaft portion 43*a* of the support member 43 is inserted into the hole portion 33*b* of the wall portion 33 and the hook portion 43*b* is engaged with the engagement hole 38*a* of the gear 38 as shown in FIGS. 10(A) and 10(B), the first surface 51 of the seal member 50 is brought into tight contact with the contact surface 33*a* of the wall portion 33, and the contact surface 44*a* of the abutting portion 44 is brought into contact with the second surface 52 of the seal member 50.

In the toner cartridge in the comparison example, when the agitation bar 40 rotates with the rotation of the gear 38, there is a possibility that the seal member 50 rotates in the same direction as the gear 38 according to the frictional force between the contact surface 44*a* of the abutting portion 44 of the support member 43 and the second surface 52 of the seal member 50.

If the rotation of the seal member 50 occurs, the seal member 50 may be deformed. Moreover, the sealing pressure between the contact surface 33*a* of the wall portion 33 and the first surface 51 of the seal member 50 may decrease, and the sealing pressure between the second surface 52 of the seal member 50 and the contact surface 44*a* of the abutting portion 44 may also decrease.

As a result, the toner may pass through between the contact surface 33*a* of the wall portion 33 and the first surface 51 of the seal member 50, and through between the second surface 52 of the seal member 50 and the contact surfaces 44*a* of the abutting portion 44. That is, the leakage of the toner to the outside of the frame body 30 of the toner cartridge may occur.

In order to suppress such a toner leakage, it is conceivable to reduce the frictional force between the second surface 52 of the seal member 50 and the contact surface 44*a* of the abutting portion 44 as small as possible. However, it is difficult to precisely control the frictional force.

In contrast, in the toner cartridge 3 in the embodiment, as shown in FIGS. 7(A) and 7(B), even when the agitation bar 40 rotates and the seal member 50 is forced to rotate due to the frictional force between the contact surface 44*a* of the abutting portion 44 and the second surface 52 of the seal member 50, the rotation of the seal member 50 is restricted by the holes 33*c* formed in the contact surface 33*a* of the wall portion 33.

Therefore, the deformation of the seal member 50 can be prevented. Further, the sealing pressure between the contact surface 33*a* of the wall portion 33 and the first surface 51 of the seal member 50 can be kept constant, and the sealing pressure between the second surface 52 of the seal member 50 and the contact surface 44*a* of the abutting portion 44 can be kept constant. As a result, the leakage of the toner to the outside of the frame body 30 of the toner cartridge 3 can be suppressed.

As shown in FIG. 8(A), in the contact surface 33*a* of the wall portion 33, the contact region A1 (first contact region) in which the holes 33*c* are formed serves to suppress the movement (rotation) of the seal member 50. The contact region A2 (second contact region) in the contact surface 33*a* of the wall portion 33 serves to restrict the passage of the toner, i.e., serves to seal the toner. Moreover, the contact region A3 (third contact region) of the contact surface 33*a* of the wall portion 33 also serves to seal the toner.

The contact region A1 (first contact region) in which the holes 33*c* are formed is located on the outer side in the radial direction with respect to the contact region A2 (second contact region) which serves to enhance the sealing property. Further, the length L2 in the radial direction of the contact region A2 is longer than the length L1 in the radial direction of the contact region A1. Therefore, even if the seal member 50 is deformed due to the entry into the holes 33*c*, the sealing effect at the contact region A2 (second contact region) can be ensured. Thus, the suppressing effect of the toner leakage can be enhanced.

The length L2 in the radial direction of the contact region A2 (second contact region) is longer than the length L1 in the radial direction of the contact region A1 (first contact region) as described above. Moreover, the length L2 in the radial direction of the contact region A2 (second contact region) is desirably longer than or equal to 2 mm, and is, for example, 2.38 mm.

In order to most enhance the toner sealing property, it is desirable that the length L2 in the radial direction of the contact region A2 (second contact region) is longer than the length L1 in the radial direction of the contact region A1 (first contact region), and is longer than or equal to 2 mm.

However, the embodiment is not limited to this example. When the length L2 in the radial direction of the contact region A2 (second contact region) is longer than the length L1 in the radial direction of the contact region A1 (first contact region), or is longer than or equal to 2 mm, the toner sealing property can be enhanced.

Therefore, in regard to the configuration example shown in FIG. 8(A), the holes 33*c* may extend into the contact region A3 (third contact region). Moreover, in the contact surface 33*a* of the wall portion 33, the holes 33*c* may be formed only in the contact region A2 on the innermost side in the radial direction (in such a case, the contact region A2 serves as the first contact region).

Figure 12A:
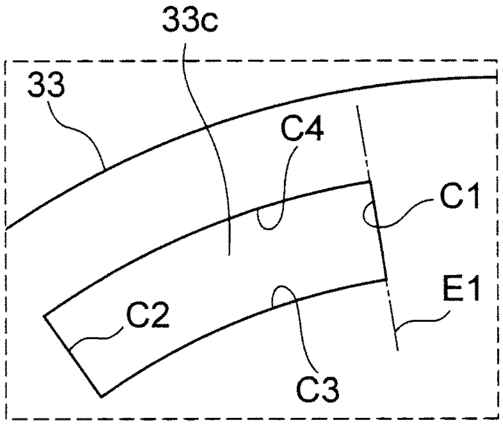
FIGS. 12(A), 12(B) and 12(C) are schematic diagrams illustrating examples of the hole of the frame body of the toner cartridge in the embodiment.
Figure 12B:
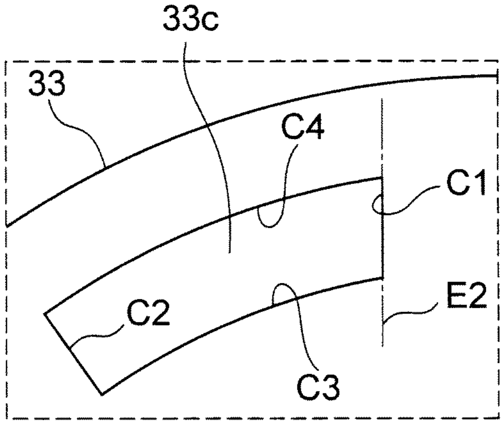
Figure 12C:
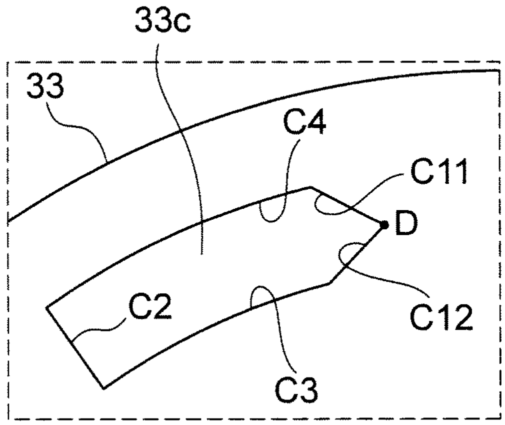

FIGS. 12(A), 12(B), and 12(C) are schematic diagrams illustrating examples of the shape of the hole 33*c* formed in the contact surface 33*a*. In the example shown in FIG. 12(A), the first end face C1 (receiving surface) of the hole 33*c* extends in the radial direction about the rotation axis Ax as shown by a dashed line E1.

When the first end face C1 of the hole 33*c* extends in the radial direction, the movement of the entry portion 55 (FIG. 7(B)) in the rotating direction R can be suppressed most effectively at the first end face C1, and the effect of suppressing the movement of the seal member 50 can be most enhanced.

However, as shown in FIG. 12(B), the extending direction of the first end face C1 of the hole 33*c* may be the direction different from the radial direction about the rotation axis Ax as shown by a dashed line E2. Even in such a case, the effect of suppressing the movement of the seal member 50 can be obtained.

Moreover, as shown in FIG. 12(C), the first end face C1 of the hole 33*c* may be formed of two end face parts C11 and C12, and a boundary part D between the end face parts C11 and C12 may be located on the most downstream side in the rotating direction R.

Although the toner cartridge 3 has been explained as an example of a developer storage body in the above description, the developer storage body is not limited to the toner cartridge 3. It is sufficient that the developer storage body includes a frame body in which a toner (developer) is stored and a seal member. For example, the developer storage body may be the unit main body 2 of the image forming unit 1, or may be a belt unit including a transfer belt.

Moreover, in the agitating bar 40, a portion in contact with the seal member 50 is not limited to the abutting portion 44 of the support member 43, but may be other portions of the agitation bar 40. For example, the agitation shaft 41 may be provided with an abutting portion in contact with the seal member 50.

Moreover, the rotating member of the developer storage body is not limited to the agitation bar 40, and it is sufficient that the rotating member is a member that agitates or conveys the toner. Moreover, the agitation bar 40 is not necessarily configured to include the agitation shaft 41, the agitation film 42, and the support member 43. For example, the agitation shaft 41 and the support member 43 may be formed integrally with each other.

Moreover, although the example in which the contact surface 33*a* in contact with the seal member 50 is formed on the wall portion 33 of the inner case 32 has been explained, the contact surface may be formed on other members. For example, the contact surface may be formed on the outer case 31.

Effects of the Embodiment

As described above, the toner cartridge 3 (developer storage body) in the embodiment includes the frame body 30 that stores the developer, the agitation bar 40 (rotating member) that agitates or conveys the developer within the frame body 30, and the seal member 50 held (sandwiched) between the frame body 30 and the agitation bar 40 in the direction of the rotation axis Ax. In the frame body 30, the contact surface 33*a* in contact with the seal member 50 has the contact region A1 (first contact region). In the contact region A1, the plurality of holes 33*c* are formed and arranged in the circumferential direction, and the contact portions 33*d* (first contact portions) are each formed between two of the adjacent holes 33*c*.

With this configuration, the movement (rotation) of the seal member 50 can be restricted by the holes 33*c* formed in the contact region A1 (first contact region) of the contact surface 33*a* of the frame body 30. Thus, the sealing pressure between the contact surface 33*a* of the frame body 30 and the seal member 50, and the sealing pressure between the seal member 50 and the contact surface 44*a* of the agitation bar 40 can be kept constant. As a result, the leakage of the toner to the outside of the frame body 30 of the toner cartridge 3 can be prevented.

Moreover, the contact surface 33*a* of the frame body 30 has the contact region A2 (second contact region), which is a substantially flat surface, formed in a different region from the contact region A1 (first contact region) in the radial direction. Thus, by the contact between the second contact region of the contact surface 33*a* and the seal member 50, the effect of suppressing the leakage of the toner (the sealing effect) can be enhanced.

Moreover, since the contact region A2 (second contact region) is provided on the inner side of the contact region A1 (first contact region) in the radial direction, the effect of restricting the movement of the seal member 50 at the contact region A1 can be enhanced, and the sealing effect of the toner at the contact region A2 can be enhanced.

Moreover, since the seal member 50 has a portion (entry portion 55) that enters into at least one of the plurality of the holes 33*c*, the effect of restricting the movement of the seal member 50 can be enhanced due to the engagement of the portion of the seal member 50 and the hole 33*c*.

Moreover, since at least one of the plurality of the holes 33*c* in the contact surface 33*a* has the first end face C1 as a receiving surface that receives a force from the portion (entry portion 55) of the seal member 50 in the rotating direction of the agitation bar 40, the effect of restricting the movement of the seal member 50 can be further enhanced.

Moreover, the first end face C1 (receiving surface) of the hole 33*c* is an end edge of the hole 33*c* extending in the radial direction about the rotation axis Ax, the effect of restricting the movement of the seal member 50 can be enhanced the most.

Although the desirable embodiment has been specifically described above, the present disclosure is not limited to the embodiment described above, and various modifications or changes can be made to the embodiment.

The image forming apparatus in the embodiment can be used as, for example, a printer, a copier, a facsimile machine, an MFP (Multi-Function Peripherals), or the like.

Various aspects of the present disclosure are collectively described below as appendixes.

Appendix 1

A developer storage body comprising:
- a frame body that stores a developer;
- a rotating member a part of which is inserted into a hole portion provided in the frame body, the rotating member agitating or conveying the developer in the frame body; and
- a seal member held between the frame body and the rotating member in a direction of a rotation axis of the rotating member,
- wherein the frame body has a contact surface in contact with the seal member, and
- wherein the contact surface has a first contact region in which a plurality of holes are formed and arranged in a circumferential direction about the rotation axis, and first contact portions are each formed between two of the plurality of holes adjacent to each other.

Appendix 2

The developer storage body according to appendix 1, wherein the contact surface of the frame body includes a second contact region at a region different from the first contact region in a radial direction about the rotation axis, the second contact region being a substantially flat surface.

Appendix 3

The developer storage body according to appendix 2, wherein the second contact region is provided on an inner side of the first contact region in the radial direction.

Appendix 4

The developer storage body according to appendix 2 or 3, wherein a length L1 of the first contact region in the radial direction is shorter than a length L2 of the second contact region in the radial direction.

Appendix 5

The developer storage body according to any one of appendixes 1 to 4, wherein at least a portion of the seal member enters into at least one of the plurality of holes.

Appendix 6

The developer storage body according to appendix 5, wherein the at least one of the plurality of holes has a receiving surface applied with a force by the portion of the seal member in a rotating direction of the rotating member.

Appendix 7

The developer storage body according to appendix 6, wherein the receiving surface extends in a radial direction about the rotation axis.

Appendix 8

The developer storage body according to any one of appendixes 1 to 7, wherein the rotating member comprises:
- a shaft member rotatable about the rotation axis; and
- a supporting member supporting the shaft member and inserted into the hole portion,
- wherein the supporting member has an abutting portion, the abutting portion and the frame body holding the seal member therebetween.

Appendix 9

The developer storage body according to any one of appendixes 1 to 8, further comprising a power transmission member provided outside the frame body, the power transmission member transmitting a power to the rotating member,
- wherein the rotating member has a second engagement portion that is engaged with a first engagement portion of the power transmission member.

Appendix 10

A developer storage body comprising:
- a frame body storing a developer;
- a rotating member a part of which is inserted into a hole portion provided in the frame body, the rotating member agitating or conveying the developer in the frame body; and
- a seal member held between the frame body and the rotating member in a direction of a rotation axis of the rotating member,
- wherein the frame body has a contact surface in contact with the seal member, and
- wherein the contact surface has:
- a first contact region in which a plurality of holes are formed and arranged in a circumferential direction about the rotation axis, and first contact portions are each formed between two of the plurality of holes adjacent to each other, the first contact region restricting a movement of the seal member relative to the frame body, and a second contact region formed at a region different from the first contact region in a radial direction about the rotation axis, the second contact region sealing the developer.

Appendix 11

An image forming unit comprising:

the developer storage body according to any one of appendixes 1 to 10;

a unit main body to which the developer storage body is mounted, wherein the unit main body comprises:

an image forming body;

a developer bearing body that bears a developer to develop an electrostatic latent image formed on the image bearing body; and a supply member that supplies the developer to the developer bearing body.

Appendix 12

An image forming apparatus comprising:

the image forming unit according to appendix 11;

a transfer portion that transfers a developer image formed by the image forming unit to a medium; and a fixing portion that fixes the transferred developer image to the medium.

DESCRIPTION OF REFERENCE CHARACTERS

1: image forming unit, 2: unit main body, 3: toner cartridge (developer storage body), 10: image forming apparatus, 11: photosensitive drum (image bearing body), 12: charging roller (charging member), 13: exposure head (exposure device), 14: developing roller (developer bearing body), 15: supply roller (supply member), 18: transfer roller (transfer member), 21: mounting portion, 30: frame body, 31: outer case, 31*a*: bottom portion, 31*h*: toner supply opening, 32: inner case, 32*a*: bottom wall portion, 32*h*: opening, 33: wall portion, 33*a*: contact surface, 33*b*: hole, 33*c*: hole, 33*g*: peripheral wall portion, 35: operation lever, 38: gear (drive member), 38*a*: engagement hole (first engagement portion), 40: agitation bar (rotating member), 41: agitation shaft (shaft portion), 42: agitation film (agitating portion), 43: support member, 43*a* shaft portion (insertion portion), 43*b*: hook portion (second engagement portion), 44: contact portion, 44*a*: contact surface, 50: seal member, 51: first surface, 52: second surface, 53: hole, 54: outer circumferential surface, 60: medium supply section, 70: fixing device, 80: medium ejection section, Ax: rotation axis, C1: first end face, M: medium.

What is claimed is:

1. A developer storage body comprising:

a frame body that stores a developer;

a rotating member a part of which is inserted into a hole portion provided in the frame body, the rotating member agitating or conveying the developer in the frame body; and a seal member held between the frame body and the rotating member in a direction of a rotation axis of the rotating member, wherein the frame body has a contact surface in contact with the seal member, wherein the contact surface has a first contact region in which a plurality of holes are formed and arranged in a circumferential direction about the rotation axis, and first contact portions are each formed between two of the plurality of holes adjacent to each other, wherein the plurality of holes have depths in the direction of the rotation axis from the contact surface, and wherein a portion of the seal member enters into at least one of the plurality of holes in the direction of the rotation axis.

2. The developer storage body according to claim 1, wherein the contact surface of the frame body includes a second contact region at a region different from the first contact region in a radial direction about the rotation axis, the second contact region being a substantially flat surface and being in contact with the seal member.

3. The developer storage body according to claim 2, wherein the second contact region is provided on an inner side of the first contact region in the radial direction.

4. The developer storage body according to claim 2, wherein a length L1 of the first contact region in the radial direction is shorter than a length L2 of the second contact region in the radial direction.

5. The developer storage body according to claim 1, wherein the at least one of the plurality of holes has a receiving surface applied with a force by the portion of the seal member in a rotating direction of the rotating member.

6. The developer storage body according to claim 5, wherein the receiving surface extends in a radial direction about the rotation axis.

7. The developer storage body according to claim 1, wherein the rotating member comprises:

a shaft member rotatable about the rotation axis; and a supporting member supporting the shaft member and inserted into the hole portion, wherein the supporting member has an abutting portion, the abutting portion and the frame body holding the seal member therebetween.

8. The developer storage body according to claim 1, further comprising a power transmission member provided outside the frame body, the power transmission member transmitting a power to the rotating member, wherein the rotating member has a second engagement portion that is engaged with a first engagement portion of the power transmission member.

9. A developer storage body comprising:

a frame body storing a developer;

a rotating member a part of which is inserted into a hole portion provided in the frame body, the rotating member agitating or conveying the developer in the frame body; and a seal member held between the frame body and the rotating member in a direction of a rotation axis of the rotating member, wherein the frame body has a contact surface in contact with the seal member, and wherein the contact surface has:

a first contact region in which a plurality of holes are formed and arranged in a circumferential direction about the rotation axis, and first contact portions are each formed between two of the plurality of holes adjacent to each other, the first contact region restricting a movement of the seal member relative to the frame body, and a second contact region formed at a region different from the first contact region in a radial direction about the rotation axis, the second contact region restricting leakage of the developer from inside to outside of the frame body through the hole portion, wherein the plurality of holes have depths in the direction of the rotation axis from the contact surface, and wherein a portion of the seal member enters into at least one of the plurality of holes in the direction of the rotation axis.

10. An image forming unit comprising:

the developer storage body according to claim 1;

a unit main body to which the developer storage body is mounted, wherein the unit main body comprises:

an image bearing body;

a developer bearing body that bears a developer to develop an electrostatic latent image formed on the image bearing body; and a supply member that supplies the developer to the developer bearing body.

11. An image forming apparatus comprising:

the image forming unit according to claim 10;

a transfer portion that transfers a developer image formed by the image forming unit to a medium; and a fixing portion that fixes the transferred developer image to the medium.

12. The developer storage body according to claim 1, wherein the seal member is compressed in the direction of the rotation axis by the contact surface of the frame body and the rotating member.

13. The developer storage body according to claim 2, wherein the contact surface including the first contact region and the second contact region is a flat surface.

* * * * *